United States Patent [19]

Flynn

[11] 3,953,267

[45] Apr. 27, 1976

[54] SAFETY LOCK BOLT

[76] Inventor: Wilford Flynn, R.R. 6, Bedford, Ind. 47421

[22] Filed: Mar. 12, 1975

[21] Appl. No.: 557,473

Related U.S. Application Data

[63] Continuation-in-part of Ser. No. 380,812, July 19, 1973, abandoned.

[52] U.S. Cl. .................................................. 151/13
[51] Int. Cl.² ........................................ F16B 39/24
[58] Field of Search ............ 151/13, 19 A; 285/363; 85/1 JP, 50

[56] References Cited
UNITED STATES PATENTS

| | | | |
|---|---|---|---|
| 991,379 | 5/1911 | Shinn et al. | 151/13 |
| 1,013,866 | 1/1912 | DeHaven | 151/13 |
| 1,088,253 | 2/1914 | Armstrong | 151/13 |
| 1,212,143 | 1/1917 | McGurn et al. | 151/19 A |
| 1,539,213 | 5/1925 | Shaw | 151/19 A |
| 2,141,701 | 12/1938 | Uherkovich | 151/13 |
| 2,551,695 | 5/1951 | Oddy | 85/50 R |
| 3,176,747 | 4/1965 | Nenzell | 85/50 R |
| 3,669,472 | 6/1972 | Nadsady | 151/13 |

FOREIGN PATENTS OR APPLICATIONS

| | | | |
|---|---|---|---|
| 88,757 | 6/1922 | Austria | 151/19 A |

Primary Examiner—Marion Parsons, Jr.
Attorney, Agent, or Firm—Woodard, Weikart, Emhardt & Naughton

[57] ABSTRACT

A bolt, lock washer and nut combination which will not loosen under vibration. The bolt includes a pair of longitudinally extending slots which slidably receive inwardly projecting lugs of the lock washer. A plurality of leaf springs integrally mounted to the lock washer project into recesses formed in the adjacent surface of the nut threaded onto the bolt. The leaf springs are sized relative to said main body to be completely contained within said main body without projecting therefrom when fully depressed. In one embodiment, the lock washer is provided with a weather sealing washer mounted thereon which is positioned on the side adjacent the bolt head. Indicating means are provided on the lock washer and nut for indicating when the leaf springs are positioned within the recesses formed on the nut.

14 Claims, 8 Drawing Figures

SAFETY LOCK BOLT

CROSS REFERENCE TO RELATED APPLICATION

This application is a continuation-in-part patent application of my co-pending U.S. patent application, Ser. No. 380,812, filed July 19, 1973 and entitled SAFETY LOCK BOLT, now abandoned.

BACKGROUND OF THE INVENTION

1. Field of the Invention

This invention is in the field of fasteners.

2. Description of the Prior Art

Disclosed herein is yet another fastener which includes a bolt which receives a lock washer in such a manner so as to prevent axial movement therebetween. In addition, leaf springs are formed on the lock washer which project into recesses of an adjacent nut so as to lock the nut to the bolt and prevent the bolt from loosening if exposed to vibration.

Some of the prior art fasteners and washers are provided with leaf springs in order to securely lock the washer and fastener together. For example in U.S. Pat. No. 1,013,866 issued to J. DeHaven, there is disclosed a washer including a plurality of leaf springs engageable within recesses of an adjacent nut. The DeHaven nut lock is not provided with any means to release the nut from the washer without breaking the lock washer or defacing the nut. Likewise, some of the prior art devices include leaf springs which when depressed project through the opposite side of the washer thereby becoming imbedded into an adjacent surface or marring the adjacent surface. The flat washer disclosed herein is provided with leaf springs sized and configured so as to be completely contained between the opposite sides of the main body of the washer when fully depressed thereby not projecting outwardly from the washer.

SUMMARY OF THE INVENTION

One embodiment of the present invention is the lock bolt comprising a bolt with a headed end and an opposite end and including a shank with external threads, such shank having a longitudinal axis with a slot interrupting the threads and extending in the direction of the axis to the opposite end, a first washer having a main body with thickness and extending continuously around the longitudinal axis with the main body including an inner circumferential edge and an outer circumferential edge, the washer having a hole through which the shank extends with the first washer including a first lug extending inwardly from the inner circumferential edge into the hole and into the slot preventing axial movement between the shank and the washer, the first washer further including a plurality of leaf springs mounted thereon, the leaf springs being positioned completely between the outer circumferential edge and the inner circumferential edge, each of the springs has a proximal end integrally attached to the first washer and a free distal end with the spring projecting toward the opposite end of the shank, the first washer having an outer circumferential edge with first indicating means thereon positioned relative to the springs, the main body having a first side with the springs projecting through the first side when extended and not depressed into the main body, the main body having a second side opposite the first side, each of the springs sized relative to the main body to be contained completely in the main body between the first side and the second side and to not project through the first side and the second side when completely depressed within the main body, a nut threadedly mounted on the shank having a surface with multiple recesses formed thereon facing the first washer and receiving the springs in the recess, the nut having second indicating means thereon positioned relative to the recesses, the first and second indicating means being aligned when the springs are positioned in the recesses, the first indicating means including a plurality of notches formed in the outer circumferential edge of the first washer, the second indicating means including a plurality of edges formed on the nut, the indicating means indicating that the plurality of springs are positioned in the recesses when the first plurality of notches are aligned with the plurality of edges, and a second washer mounted on the first washer on a side of the first washer opposite the springs and closest to the headed end, each of the springs being formed from the first washer having an opening in the first washer immediately adjacent each spring, each spring has a center portion between the distal end and the proximal end positioned closer to the opposite end than the distal end preventing the distal end from first contacting the nut, the springs are yieldable and will depress as the nut is tightened and will snap into the recesses locking the nut to the first washer, the center portion contacting the nut when the nut is loosened depressing the springs and avoiding contact and interference between the distal end of each spring and the nut, each of the springs extend from the proximal ends to the distal ends around the longitudinal axis in the same direction.

It is an object of the present invention to provide a new and improved fastener.

A further object of the present invention is to provide a fastener which is vibration proof.

In addition, it is an object of the present invention to provide a washer having leaf springs completely contained between the opposite sides of the washer when fully depressed.

Related objects and advantages of the present invention will be apparent from the following description.

DESCRIPTION OF THE PREFERRED EMBODIMENT

Figure 1:
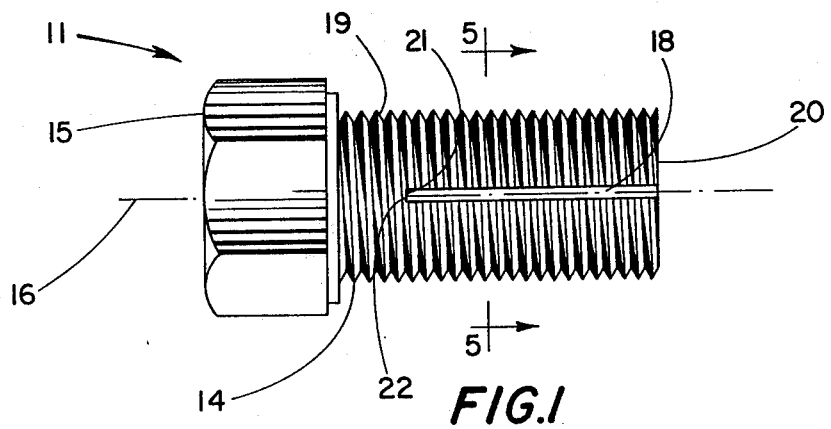
FIG. 1 is a side view of a bolt incorporating the present invention.

For the purpose of promoting an understanding of the principles of the invention, reference will now be made to the embodiment illustrated in the drawings and specific language will be used to describe the same.

It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring now more particularly to the drawing, there is shown a cross sectional view of a lock bolt device 10 which includes a bolt 11 receiving a lock washer 12 and a nut 13. Bolt 11 has a shank 14 integrally mounted to a hexagonally shaped head 15. The shank is provided with external threads with the longitudinal axis 16 extending centrally through the shank. A pair of slots 17 and 18 interrupt threads 19 and extend in the direction of axis 16 to end 20. Each slot stops short of headed end 15. For example, slot 18 stops at location 21 forming a stop surface 22.

Washer 12 has a main body 23 with hole 24 extending therethrough. Shank 14 extends through hole 24 with lugs 25 and 26 fitting respectively into slots 18 and 17 of shank 14 thereby preventing relative axial movement between shank 14 and washer 12.

Nut 13 is threadedly mounted onto shank 14 with washer 12 positioned between headed end 15 and nut 13. Surface 27 of nut 13 faces surface 28 of washer 12 when the nut is threaded onto the shank of the bolt. A plurality of recesses 29 are provided on surface 27 to lockingly receive a plurality of springs 30 which project outwardly of surface 28 of washer 12. When nut 13 is tightened against washer 12, springs 30 are compressed into recesses 29 locking the nut on shank 14. Each spring 30 is a leaf spring having a proximal end 31 integrally attached to the washer and a free distal end 32 which projects toward end 20 of shank 14. Positioned between ends 31 and 32 of each spring 30 is a center portion 33 which is located closer to end 20 of shank 14 than either end of the spring preventing end 32 from first contacting surface 27 of nut 13. The springs are yieldable and will depress as the nut is tightened and will snap into recesses 29 locking the nut to washer 12.

Surface 34 of washer 12 is located closer to headed end 15 than to end 20. Surface 34 is provided with a flat groove 35 formed thereon which extends circumferentially around the washer and adjacent outer edge 36. A second washer 38 is mounted in groove 35 and has a surface 37 which is flush with surface 34. Washer 38 may be produced from a material such as plastic providing a weather seal and preventing moisture from contacting springs 30 through surface 34 of washer 12. Each spring 30 is formed from washer 12 providing an opening 39 adjacent to each spring.

A plurality of notches 40 are formed in the outer circumferential edge of washer 12 and washer 37 which are alignable with the six edges 41 of nut 13. Notches 40 are positioned with respect to springs 30 and edges 41 are positioned with respect to recesses 29 in such a manner that the springs will be positioned in the recesses whenever notches 40 are aligned with edges 41.

Many variations are contemplated and included in the present invention. For example, the headed end and the nut are shown as hexagonally configured whereas many other configurations, such as an octogonal configuration may be utilized. In one embodiment, washer 12 was produced from spring steel whereas washer 38 was produced from plastic. This lock bolt device is vibration proof due to the curved design of the spring steel leaf springs. Washer 12 is shown with six equally spaced depressions which can be V-shaped or a straight mark for each corner of the hexagonally shaped nut to be aligned therewith. Of course, if the nut has an octagonal configuration, then eight notches would be provided in washer 12. Six recesses 29 are shown on surface 27 of nut 13 whereas three leaf springs are shown provided on washer 12. The number of leaf springs and recesses may be varied. The recesses in nut 13 can be of a slightly greater length than the length of the leaf springs to give a slight variation in notches 40 and edges 41 for the locked position. As the leaf springs rest in the recesses of nut 13 while the bolt is in service, the leaf springs will never weaken regardless of time. Washer 38 may be deleted if desired. The lock bolt device disclosesd herein is very efficient on all types of machinery where vibration has a tendency to loosen the fasteners such as bolting down diesel engines and securing railroad rails together. The leaf springs may be of equal thickness with the main body of the washer and can be stamped out in one operation.

Figure 7:
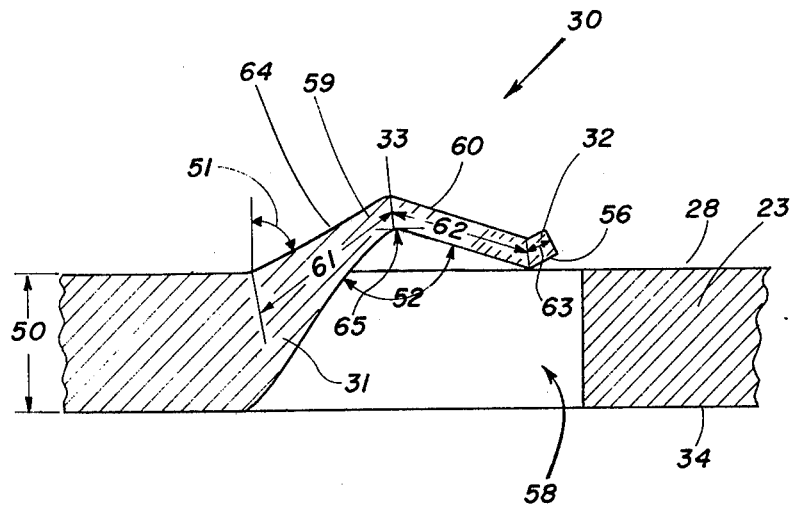
FIG. 7 is an enlarged fragmentary cross sectional view of one of the leaf springs shown in FIG. 2.
Figure 8:
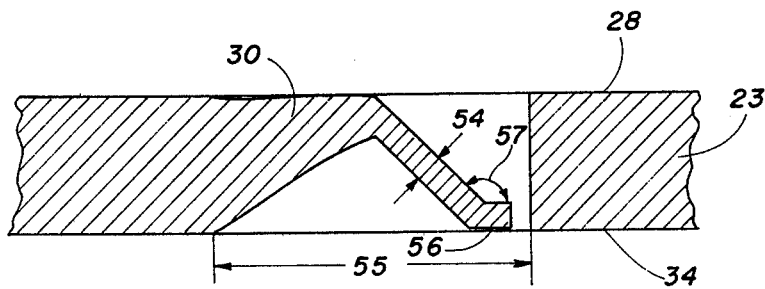
FIG. 8 is the same view as FIG. 7 only showing the leaf spring fully depressed.

An enlarged fragmentary cross sectional view of one of the leaf springs 30 is shown in FIG. 7. Leaf spring 30 normally projects outwardly through side 28 of the main body 23 of the washer. When leaf spring 30 is fully depressed as shown in FIG. 8, the leaf spring is contained between sides 28 and 34 of main body 23 and does not project through side 34. The leaf spring is sized and configured to be completely contained within opening 58 provided in the washer main body. The thickness 54 of leaf spring 30 is less than thickness 50 of main body 23 except where the leaf spring is joined at its proximal end 31 to main body 23. The length 55 of opening 58 is greater than the length of the leaf spring when the leaf spring is fully depressed as shown in FIG. 8.

Leaf spring 30 includes a center portion 33 having a pair of legs 59 and 60 integrally joined together at an oblique angle 52. Leg 59 is integrally joined at proximal end 31 to the main body and incudes a gradually increasing thickness eventually equaling the thickness 50 at proximal end 31. Leg 60 extends toward the distal end 32 of the leaf spring and is integrally joined thereto at an oblique angle 57.

Distal end 32 includes a flat lower surface 56 which is parallel with side 34 only when the spring is fully depressed into the main body (FIG. 8). When the spring is extended through side 28, surface 56 is not parallel with either side 28 or side 34. Surface 56 by being parallel with side 34 when the spring is fully depressed prevents the distal end of the spring from digging into a surface adjacent side 34 of the washer.

Figure 2:
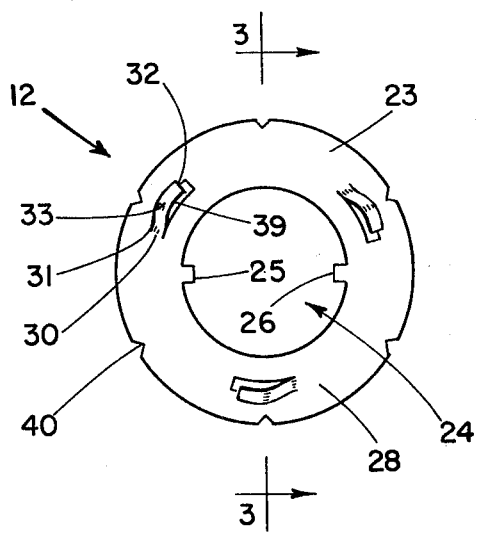
FIG. 2 is a plan view of a lock washer mountable to the bolt of FIG. 1.
Figure 3:
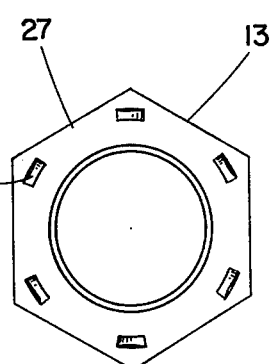
FIG. 3 is a cross sectional view taken along the line 3—3 of FIG. 2 and viewed in the direction of the arrows.
Figure 4:
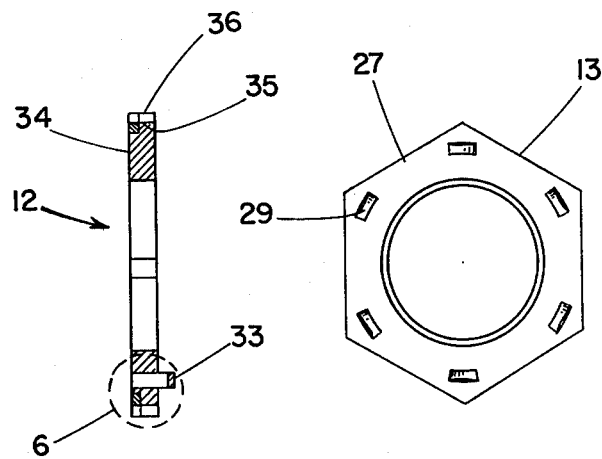
FIG. 4 is a plan view of a nut which is mountable to the bolt of FIG. 1.
Figure 6:
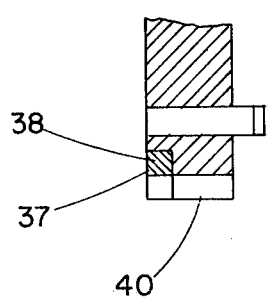
FIG. 6 is a fragmentary enlarged view of the area enclosed by circle 6 of FIG. 3.
Figure 5:
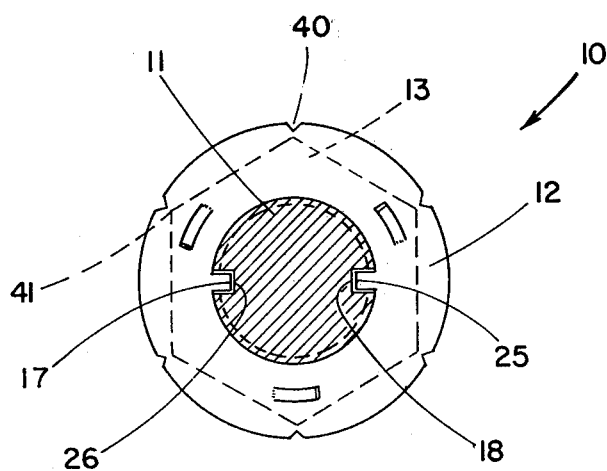
FIG. 5 is a cross sectional view taken along the line 5—5 of FIG. 1 showing the washer of FIG. 2 and the nut of FIG. 4 mounted to the bolt of FIG. 1.

In one embodiment, the outside diameter of the washer shown in FIG. 2 was approximately equal to 2 inches. In this same embodiment, the leaf spring included the following angles: angle 51 equals 62°, angle 52 equals 120°, and angle 57 equals 135°. In this same embodiment, the lengths 55 of opening 58 was 0.440 inches whereas the length of the top surface 64 of the leaf springs on leg 59 as shown by dimension 61 was 0.228 inches, the length of leg 60 as shown by dimension 62 was 0.200 inches and the length of the distal end on the top surface 64 as shown by dimension 63 was 0.028 inches. The thickness 54 of leg 60 and distal end 52 was equal to 0.045 inches whereas the thickness 50 of main body 23 was 0.180 inches. In the same embodiment, the bottom surface of legs 59 and 60 at location 65 was approximately 0.056 inches from side 28 when fully extended.

The main body of the flat washer 23 extends continuously around the longitudinal axis 16 of the bolt with the springs being located between the inner circumferential edge and the outer circumferential edge of the washer. The center portion 33 of each leaf spring contacts nut 13 when the nut is loosened depressing the springs and avoiding contact and interference between the distal end 32 of each spring and nut 13. Each of the springs 30 extend from their proximal ends to their distal ends around the longitudinal axis 16 in the same direction. The number of recesses 29 provided in the nut is twice the number of springs 30 provided on the washer. In addition, the number of washers 40 in the washer equals the number of longitudinally extending edges 41 provided on the nut.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

The invention claimed is:

1. The lock bolt comprising:
   a bolt with a headed end and an opposite end and including a shank with external threads, such shank having a longitudinal axis with a slot interrupting said threads and extending in the direction of said axis to said opposite end;
   a first washer having a main body with thickness and extending continuously around said longitudinal axis with said main body including an inner circumferential edge and an outer circumferential edge, said washer having a hole through which said shank extends with said first washer including a first lug extending inwardly from said inner circumferential edge into said hole and into said slot preventing axial movement between said shank and said washer, said first washer further including a plurality of leaf springs mounted thereon, said leaf springs being positioned completely between said outer circumferential edge and said inner circumferential edge, each of said springs has a proximal end integrally attached to said first washer and a free distal end with said spring projecting toward said opposite end of said shank, said first washer having an outer circumferential edge with first indicating means thereon positioned relative to said springs, said main body having a first side with said springs projecting through said first side when extended and not depressed into said main body, said main body having a second side opposite said first side, each of said springs sized relative to said main body to be connected completely in said main body between said first side and said second side and to not project through said first side and said second side when completely depressed within said main body;
   a nut threadedly mounted on said shank having a surface with multiple recesses formed thereon facing said first washer and receiving said springs in said recesses, said nut having second indicating means thereon positioned relative to said recesses, said first and second indicating means being aligned when said springs are positioned in said recesses, said first indicating means including a plurality of notches formed in said outer circumferential edge of said first washer, said second indicating means including a plurality of edges formed on said nut, said indicating means indicating that said plurality of springs are positioned in said recesses when said first plurality of notches are aligned with said plurality of edges; and
   a second washer mounted on said first washer on a side of said first washer opposite said springs and closest to said headed end, each of said springs being formed from said first washer having an opening in said spring washer immediately adjacent each spring;
   each spring having a center portion between said distal end and said proximal end positioned closer to said proximal end than said distal end preventing said distal end from first contacting said nut, said springs are yieldable and will depress as said nut is tightened and will snap into said recesses locking said nut to said first washer, said center portion contacting said nut when said nut is loosened depressing said springs and avoiding contact and interference between said distal end of each spring and said nut, each of said springs extend from said proximal ends to said distal ends around said longitudinal axis in the same direction;
   each of said springs includes a thickness less than said thickness of said main body to not project through said second side when fully depressed into said main body;
   said distal end of said spring includes a flat portion parallel with said second side only when said springs are fully depressed into said main body.

2. The lock bolt device of claim 1 wherein:
   said center portion of each spring has a pair of legs integrally and obliquely joined together with one leg being integrally joined at said proximal end to said main body and with a gradually increasing thickness eventually equal to said thickness of said main body and the other of said legs extending toward and integrally joined to said distal end at an oblique angle.

3. The lock bolt device of claim 1 wherein:
   said shank includes a second slot on a side of said shank opposite said first slot, said second slot interrupts said threads and extends in the direction of said axis to said opposite end, said first washer includes a second lug projecting into said hole opposite said first lug and into said second slot preventing with said first lug relative rotation between said first washer and said shank;
   said nut includes a number of said recesses twice the number of said springs on said first washer, said first washer includes a number of said notches equal to the number of said edges on said nut.

4. The lock bolt device of claim 2 wherein:
   said shank includes a second slot on a side of said shank opposite said first slot, said second slot interrupts said threads and extends in the direction of said axis to said opposite end, said first washer includes a second lug projecting into said hole opposite said first lug and into said second slot preventing with said first lug relative rotation between said first washer and said shank;
   said nut includes a number of said recesses twice the number of said springs on said first washer, said first washer includes a number of said notches equal to the number of said edges on said nut.

5. The lock bolt comprising:

a bolt with a headed end and an opposite end and including a shank with external threads, such shank having a longitudinal axis with a slot interrupting said threads and extending in the direction of said axis to said opposite end;

a first washer having a main body with thickness and extending continuously around said longitudinal axis with said main body including an inner circumferential edge and an outer circumferential edge, said washer having a hole through which said shank extends with said first washer including a first lug extending inwardly from said inner circumferential edge into said hole and into said slot preventing axial movement between said shank and said washer, said washer further including a plurality of leaf springs mounted thereon, said leaf springs being positioned completely between said outer circumferential edge and said inner circumferential edge, each of said springs having a proximal end integrally attached to said first washer and a free distal end with said spring projecting toward said opposite end of said shank, said main body having a first side with said springs projecting through said first side when extended and not depressed into said main body, said main body having a second side opposite said first side, each of said springs sized relative to said main body to be contained completely in said main body between said first side and said second side and to not project through said first side and said second side when completely depressed within said main body;

a nut threadedly mounted on said shank having a surface with multiple recesses formed thereon facing said first washer and receiving said springs in said recesses;

each spring has a center portion between said distal end and said proximal end positioned closer to said proximal end than said distal end preventing said distal end from first contacting said nut, said springs are yieldable and will depress as said nut is tightened and will snap into said recesses locking said nut to said first washer, said center portion contacting said nut when said nut is loosened depressing said springs and avoiding contact and interference between said distal end of each spring and said nut, each of said springs extend from said proximal ends to said distal ends around said longitudinal axis in the same direction;

each of said springs includes a thickness less than said thickness of said main body to not project through said second side when fully depressed into said main body;

said distal end of each spring includes a portion parallel with said second side only when said springs are fully depressed into said main body.

6. The lock belt device of claim 5 wherein:

the portion of said distal end of each spring which is parallel with said second side only when said springs are fully depressed into said main body is a flat surface which is essentially coplanar with said second side when said springs are fully depressed.

7. The lock bolt device of claim 5 wherein:

said shank includes a second slot on a side of said shank opposite said first slot, said second slot interrupts said threads and extends in the direction of said axis to said opposite end, said first washer includes a second lug projecting into said hole opposite said first lug and into said second slot preventing with said first lug relative rotation between said first washer and said shank;

said nut includes a number of said recesses twice the number of said springs on said first washer, said first washer includes a number of said notches equal to the number of said edges on said nut.

8. The lock bolt device of claim 6 wherein:

said shank includes a second slot on a side of said shank opposite said first slot, said second slot interrupts said threads and extends in the direction of said axis to said opposite end, said first washer includes a second lug projecting into said hole opposite said first lug and into said second slot preventing with said first lug relative rotation between said first washer and said shank;

said nut includes a number of said recesses twice the number of said springs on said first washer, said first washer includes a number of said notches equal to the number of said edges on said nut.

9. The lock bolt device of claim 5 wherein:

said nut and said first washer include means for indicating when said plurality of springs are positioned in said recesses.

10. The lock bolt device of claim 6 wherein:

said nut and said first washer include means for indicating when said plurality of springs are positioned in said recesses.

11. The lock bolt device of claim 9 wherein:

said indicating means consist of a plurality of notches formed in said outer circumferential edge of said first washer and a plurality of edges formed on said nut, said indicating means indicating that said plurality of springs are positioned in said recesses when said plurality of notches are aligned with said plurality of edges.

12. The lock bolt device of claim 10 wherein:

said indicating means consist of a plurality of notches formed in said outer circumferential edge of said first washer and a plurality of edges formed on said nut, said indicating means indicating that said plurality of springs are positioned in said recesses when said plurality of notches are aligned with said plurality of edges.

13. The lock bolt device of claim 5 wherein:

said first washer includes a second washer mounted on said first washer on a side of said first washer opposite said springs and closest to said headed end, each of said springs being formed from said first washer having an opening in said first washer immediately adjacent each spring.

14. The lock bolt device of claim 6 where:

said first washer includes a second washer mounted on said first washer on a side of said first washer opposite said springs and closest to said headed end, each of said springs being formed from said first washer having an opening in said first washer immediately adjacent each spring.

* * * * *